United States Patent Office 2,900,819
Patented Aug. 25, 1959

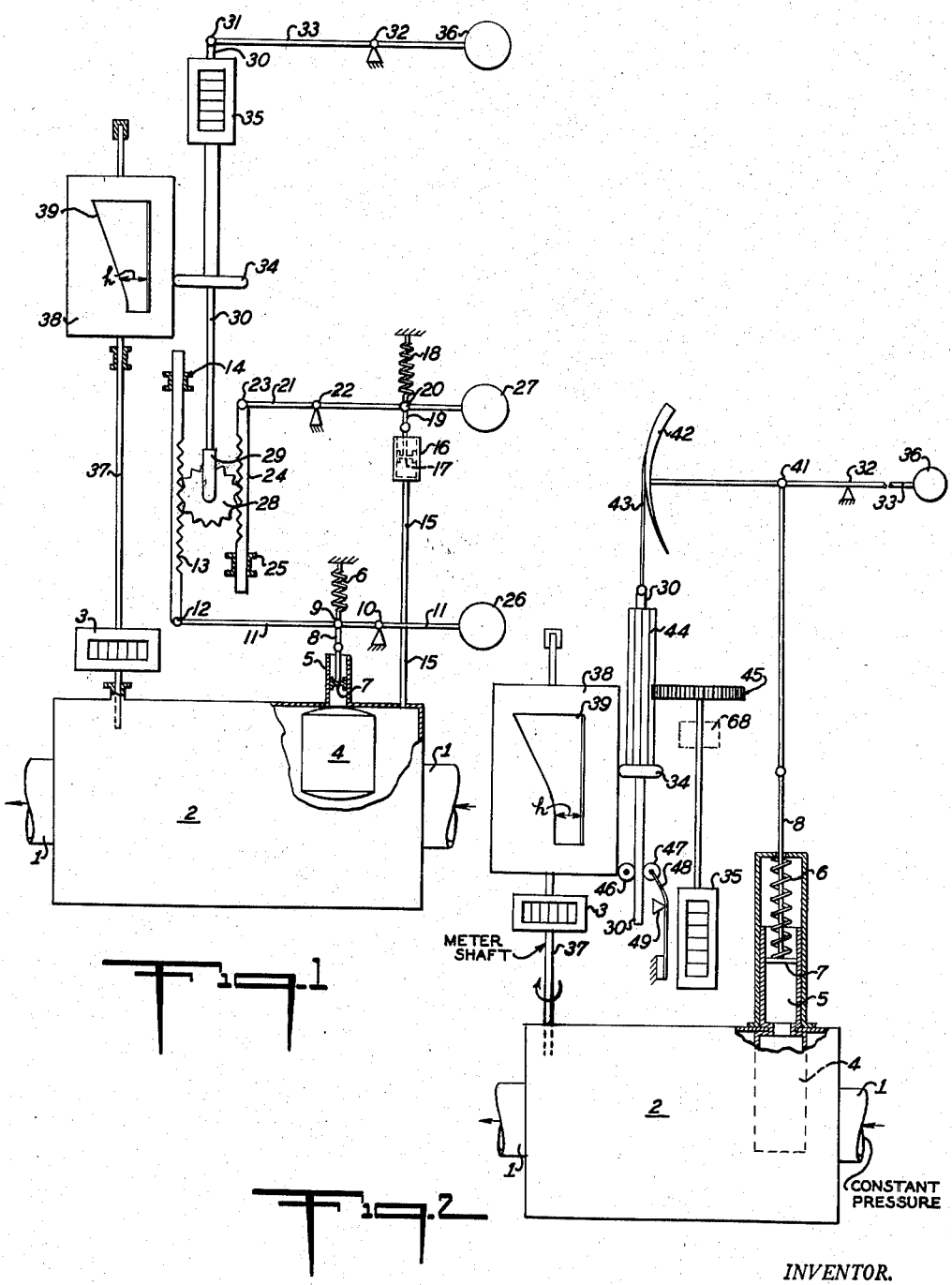

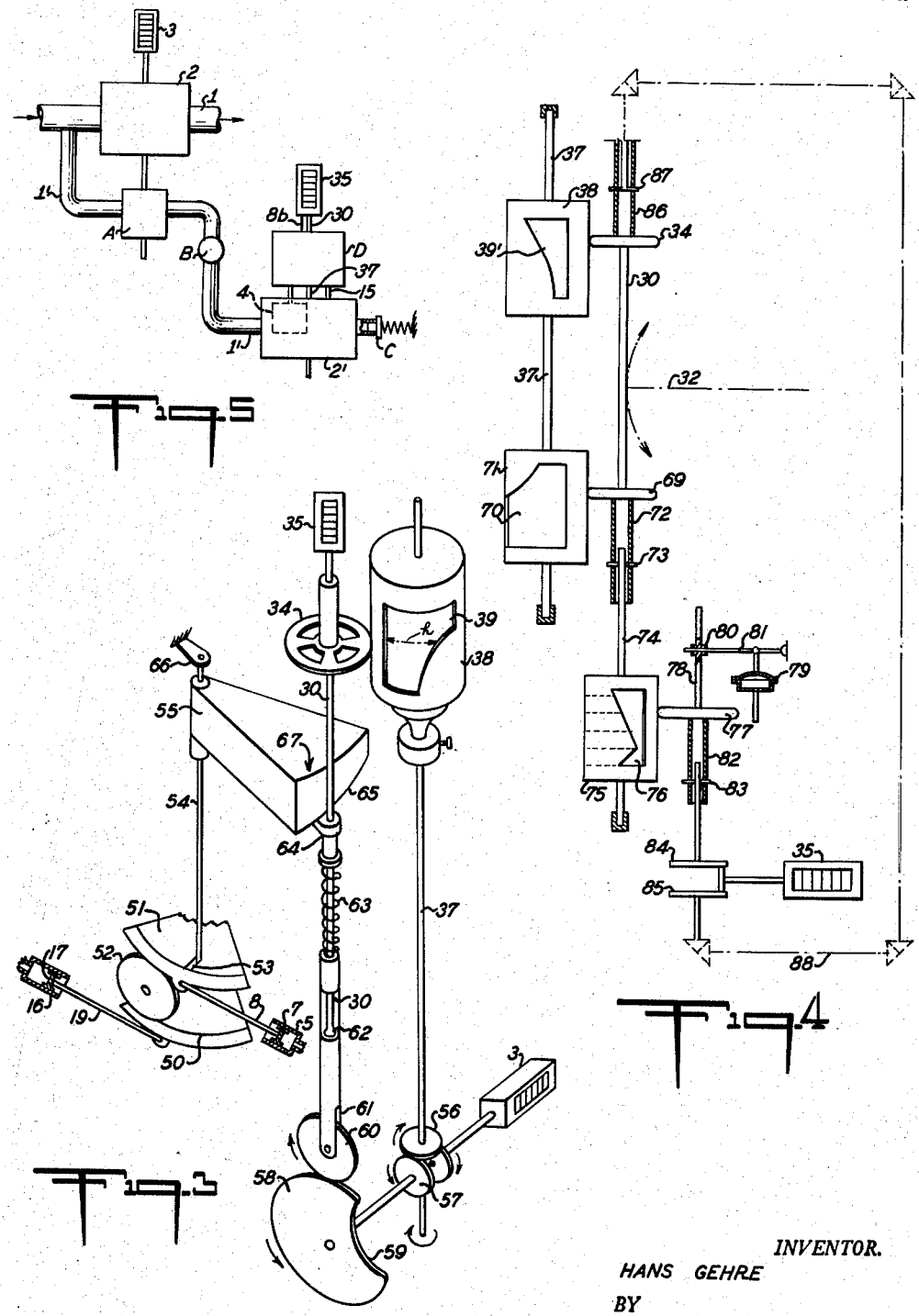

2,900,819

GAS FLOW MEASURING EQUIPMENT

Hans Gehre, Oberkassel (Rhine), Germany

Application September 8, 1950, Serial No. 183,829

Claims priority, application Germany
September 10, 1949

8 Claims. (Cl. 73—233)

The present invention relates to a method for volume reduction of gases flowing in pipe lines.

In the usual reduction method an elastic membrane-box of thin-walled corrugated tube with a comparison-gas enclosed therein is exposed to the gas to be measured, whereby the comparison-gas assumes the pressure and temperature of the gas to be measured and its volume-change expressed as a movement of the membrane-bottom controls a variable-ratio-friction-drive or another correction device provided in the drive transmission to the counting mechanism of the meter.

Volume reductor devices which work according to this known method mostly lose their reliability after a relatively short period of working time, as a result of the above-mentioned volume-changes, since the inherent elasticity of the corrugated membrane-box, which must be allowed for in calibrating the reductor and which causes a considerable straining of the material used, alters progressively until finally the permanent extension of the box makes its replacement essential. There is also always the danger with these reductors that due to suddenly occurring excess pressures or loss of pressure in the pipe line the membrane-box will be damaged and becomes useless.

The aforesaid disadvantages apply in a similar manner to a proposed volume reduction process, in which the elastic membrane-box controls a regulator such as a pressure-regulator or a temperature-regulator over a relay, with an electrically operated heater located in the measuring-duct, whereby the ratio $p/T$ of the absolute pressure and the absolute temperature is maintained constant and a variable ratio drive is unnecessary.

It has already been proposed to enclose the comparison-gas in a lobe-like envelope and to submerge this in a chamber filled with liquid whereby the whole (the liquid-chamber and the envelope of comparison-gas) is exposed to the gas to be measured, and the height of the liquid meniscus provides the value for the actual size of the comparison-gas volume.

In this method, the temperature equalization between the comparison-gas and the gas to be measured takes place extremely slowly because of the intermediate liquid; the indication-correction is retarded for some time against the throughput in the meter and a false measurement results. Moreover, because of the temperature difference between the liquid in the transfer duct and the gas to be measured, the size of the comparison-gas volume is not correctly indicated.

The present invention provides for a volume reductor which is constructed with a comparison-gas controlled by working gas, which is free from the above-mentioned disadvantages and errors. It represents a new and simpler method of volume-reduction and comprises essentially that the comparison-gas volume is constant or substantially constant and the value for the reduction factor is calculated by apparatus and applies as the comparison-gas.

In the specification where the term "over pressure" is employed, the same may also be read as gauge pressure.

The invention and the principal calculations on which it is based are more fully explained in the following.

It is known that the reduction of working volumes at the state $P$, $T$ to the normal state $p_0, T_0$ is by the equation of state:

$$\frac{p \cdot V}{T} = \frac{p_0 \cdot V_0}{T_0}$$

($T_0 = 273°$ absolute)

and $$V_0 = V \cdot \frac{p \cdot T_0}{p_0 T}$$

or if one sets $$\frac{p \cdot T_0}{p_0 \cdot T} = k : V_0 = V \cdot k$$

where $k$ is the correction-factor. If one puts into this expression $p = p_0 + \Delta p$ and $T = T_0 + \theta$ where $\Delta p$ is the difference between the absolute working pressure and the absolute pressure to which the measuring results will be reduced and $\theta$ is the working temperature of the measured gas i.e., $\theta = T - T_0$, the quotients can be expanded in a series, $$k = \frac{p \cdot T_0}{p_0 \cdot T} = \left(1 + \frac{\Delta p}{p_0}\right) : \left(1 + \frac{\theta}{T_0}\right)$$

$$= 1 + \frac{\Delta p}{p_0} - \frac{\theta}{T_0} - \frac{\theta}{T_0} \cdot \frac{\Delta p}{p_0} + \ldots$$

If it concerns relatively small pressure and temperature changes the series can cut off after the third term $\theta/T_0$ as the fourth term due to its smallness of a second order is already negligible and this gives the simple formula:

$$k = 1 + \frac{\Delta p}{p_0} - \frac{\theta}{T_0} \qquad (I)$$

If now the equivalent pressure quotients are used according to the invention in place of the temperature quotients $\theta/T_0$, by enclosing the comparison-gas in a constant-volume rigid chamber, and bringing it to the temperature of the gas to be measured then a further considerable simplification is given, as shown by the following calculation.

As to the enclosed comparison-gas volume $V^*$ if $p^*$ and $p_0^*$ are the relative pressures, the equation of state gives:

$$V_0^* \cdot \frac{p_0^*}{T_0} = V^* \cdot \frac{p^*}{T}$$

As now, however, the volume in the rigid chamber is constant although $V^* = V_0^*$, it follows that:

$$\frac{p^*}{p_0^*} = \frac{T}{T_0}$$

If one lets $T = T_0 + \theta$ and thereafter expresses $$p^* = p_u^* + ba$$

where $ba$ is the atmospheric pressure, that is the absolute pressure $p^* \ldots$ of the comparison-gas as the sum of its over-pressure $p_u^*$ and the barometer height, the simple equation follows:

$$\frac{\theta}{T_0} = \frac{p_u^* + ba}{p_0^*} - 1$$

and if one makes $p_0^* = p_0$, then $$\frac{\theta}{T_0} = \frac{p_u^* + ba}{p_0} - 1$$

Finally, as $\Delta p = p_u + ba - p_0$ Equation I now becomes the Equation II:

$$k = 1 + \frac{p_u}{p_0} - \frac{p_u^*}{p_0} \qquad (II)$$

as the result of which in the correction method of the present invention for determining the factor $k$, further barometric pressure measurements are not necessary as the existing working over-pressure is all that is needed.

The Equation II shows that it is two pressures which determine the setting of the value of the correction factor. If now one of these two pressures, the working over-pressure of the gas to be measured is maintained constant by means of a regulator or a safety valve a further simplification in the measurements results.

Then $$\left(1+\frac{p_u}{p_0}\right)$$

is also constant, and if in simplification one allows $$1+\frac{p_u}{p_0}=a$$

Equation III follows $$k=a-\frac{p_u^*}{p_0} \quad \text{(III)}$$

In these cases also the reduction factor $k$ depends upon both over-pressures. As one however is constant, it is sufficient to measure the other variable one and to cause its operating upon the correcting mechanism, provided in the drive transmission to the counting mechanism of the meter.

The drawings give several embodiments of devices for carrying out the methods according to the invention in diagrammatic form, wherein several parts are separated from each other for greater clarity.

Fig. 1 diagrammatically shows an embodiment of the volume correction device in accordance with the invention in which both the pressures of the measuring gas and that of the comparison-gas are measured;

Fig. 2 diagrammatically shows a different embodiment of the volume correction device in accordance with the invention in which only the pressure of the comparison-gas is measured;

Fig. 3 diagrammatically shows a different embodiment of the volume correction device shown in Fig. 1;

Fig. 4 diagrammatically shows another embodiment of the volume correction device according to the invention adapted for operation over a broad range of working conditions;

Fig. 5 diagrammatically shows an embodiment of the volume correction device in accordance with the invention adapted for part-flow measurements.

Fig. 1 shows an embodiment by way of example corresponding to the case for the method according to Equation II, in which both pressures, that of the measuring gas and that of the comparison-gas, are variable and to be measured.

1 indicates the main duct in which the gas-meter 2 is arranged, of which the counting mechanism 3 gives the number of cubic meters of gas consumed under the working conditions P, T. The arrow shows the direction of flow. In the entry side of the meter 2 is located a rigid closed container 4 constructed with a manometer which is shown here by way of example as an indicator piston 7 acting in a cylinder 5 against a spring 6. Naturally any other type of manometer can be provided for the same purpose, for example, a membrane manometer.

The manometer engages the lever 11, which is pivoted at 10 on a knife edge, by means of a connecting rod 8 at the point 9. This is linked at 12 to a rack 13 which is guided at 14. A pressure duct 15 leads from the entry of the meter 2 to a manometer which is shown here as a cylinder 16 with an indicator-piston 17 and a loading spring 18. The indicator-piston 17 is connected at 20 to the lever 21 by means of the connecting rod 19, the lever 21 being pivoted on a knife edge at 22.

A rack 24 is linked to the lever 21 at 23 which rack is guided at 25. Counter weights 26, 27 serve to balance the levers 11 and 21 and the mechanism connected thereto.

The racks 13 and 24 engage a toothed wheel 28 which is carried in a stirrup 29. The stirrup is supported on a rod 30, which is joined at 31 to a lever 33 supported on a knife edge at 32. Rotatable on the rod 30 is a friction wheel 34, the rotation of which is transmitted to the counting mechanism 35 of the volume reductor also secured to the shaft 30. The counterweight 36 carried by the lever 33 serves to balance the parts supported therefrom so that on rotation of the toothed wheel 28 no additional forces have to be overcome.

The shaft 37 of the gas meter 2 drives in addition to the counting mechanism 3 a cylinder 38 on which the friction wheel 34 runs. This cylinder 38 is provided with an opening 39 which releases the friction wheel 34 once for each rotation of the cylinder 38. By this arrangement an unrestricted setting of the friction wheel by means of the two manometers 5, 6, 7 and 16, 17, 18 is made possible. These manometers move the associated racks 13 and 24 in opposite directions so that the displacement of the toothed wheel 28 and hence also of the friction wheel 34 is proportional to the difference between the movements of the two racks 13 and 24 and hence also proportional to the difference of the over-pressures measured by the two manometers 5, 6, 7 and 16, 17, 18. As the manometer 5, 6, 7 measures the over-pressure $p_u^*$ of the chamber 4 enclosing the comparison-gas and the manometer 16, 17, 18 measures the over-pressure $p_u$ of the gas in the duct, the position of the friction wheel 34 is an exact measure for the reduction factor $k$ and the height $h$ of the opening 39 in the drum 38 must now be so chosen that the transmission ratio between the drum or cylinder 38 and the friction wheel 34 is equal to the correction-factor $k$ corresponding to that position of the friction wheel. Then the reading on the counting mechanism 35 of the volume reductor in accordance with the above-derived relation $V_0=k.V$ is equal to $k$-times the reading on the mechanism 3.

Figure 2 shows by way of example an embodiment corresponding to the case of the process according to Equation III, according to which the working over-pressure $p_u$ is maintained constant by a regulator not shown, whereby its measurement is unnecessary and for the setting of the correction mechanism only a single manometer is necessary namely that which measures the pressure $p_u^*$ of the comparison-gas.

The reading of this manometer 5, 6, 7 is carried directly to the lever 33 pivoted at 32 and connected to rod 8 at 41. This lever carries a segment 42 to which is attached a steel band 43 from which the shaft 30 is suspended with the friction wheel 34 rotatable thereon.

By a toothed drum 44 connected with this friction wheel and rotatable with it on the shaft 30 and a non-displaceable toothed wheel 45, the rotation of the friction wheel 34 is transferred to the counting mechanism 35 of the corrector. The toothed drum 44 and the toothed wheel 45 loosely engage together so that axial movement of the toothed drum 44 can occur freely. A pair of wheels 46, 47 serve to guide the shaft 30. The wheel 47 operates under the action of a spring 48, so that the friction wheel 34 always abuts the drum 38 with a slight pressure. A stop 49 limits the movement of the spring 48 so that the friction wheel 34, when it is alongside the opening 39 of the drum 38, hangs freely and no rubbing which deteriorates the movableness of the toothed drum 44 can occur at this point.

The transmission ratio between the drum 38 and the friction wheel 34 is a multiple of the correction factor $k$. This multiple is further transferred back by means of the toothed wheel 45 to the single $k$ value, so that the reading of the correcting mechanism carries $k$-times the reading of the main mechanism.

The invention is not limited to the example described but permits adaptation in various ways in practice.

Figure 3 shows another embodiment by way of example corresponding to the case of the process according to Equation II, which very simply produces sensitivity in the mechanism.

The two manometers 5, 7, 8 and 16, 17, 18 rotate a ring-shaped differential 50, 51, 52, 53, which corresponds in general to the rack-differential 13, 24, 28 in Figure 1, and an upstanding shaft 54, whereby a sector shaped setting member 55 attached to this shaft swings freely. This swinging is proportional to the difference of the pressures $p_u^*$ and $p_u$ measured on the two manometers.

A cam-disc 58 with a cut-off 59 operated by the mechanism shaft 37 by means of the toothed wheels 56 and 57, operates by a roller 60, a stirrup 61 running on the axis of this roller, in which the knob-shaped lower end 62 of the shaft 30 serving as a stop is guided. The stirrup 61 carries a light spring 63 by which the shaft 30 with its attached finger-shaped key 64 is supported. This key presses from beneath against the setting member 55 under the action of the spring 63 with a slight pressure. The arrangement is so disposed that the roller 60, when the friction wheel 34 reaches the opening 39 of the drum 38, lies alongside the cut-off 59 of the cam-disc 58. Thus the stirrup 61 moves downward so that the spring 63 expands and the finger 64 releases the setting member 55. At this moment the operation of the now freely movable setting member occurs. This limits by its return action with the finger 64, the movement of the shaft 30 and the friction wheel 34. By any further downward movement of the stirrup the spring 63 only is pressed further back.

The setting member 55 is provided on its lower side with an incline 65, by which the movement of the friction wheel 34 for each swing of the setting member 55 is varied. This incline is so chosen that the size of the movement of friction wheel 34, which is given on each touching against the finger 64, is proportional to the swing of the setting member and thus to the correction-factor $k$. The determination of the height $h$ of the drum-opening 39 is made in the same manner as described for Figure 2.

The top-bearing 66 of the setting member shaft 54 is provided with such a play that the setting member 55 is permitted to yield a little to the spring pressure before it abuts the rigid stop 67. This small amount of play is taken up by the movement of the friction wheel 34.

Practically no energy is required to operate the setting member 55. The energy for operating the friction wheel is supplied by the gas-meter, so that the manometers are not overloaded thereby. Thus an extremely sharp and finely adjusted setting is guaranteed.

In the embodiment described by way of example the transmission ratio between the meter-shaft and the counting mechanism of the volume reductor will be variable.

The Equation II also retains its validity if higher pressures are measured and $p_0$ is a multiple of 760 mm. of mercury, for example 2, 3 or 4 atmospheres. Care must then be taken with regard to the need for equality of $p_0^*$ and $p_0$, so that for $\theta = 0°$ C. the absolute pressure $p_0^*$ in the comparison gas chamber is likewise 2, 3 or 4 atmospheres. Then it is reduced to these pressures instead of to the normal pressure of 760 mm., and the correction-factor $k'$ given by Equation II is valid for 0° C. and 2, 3 or 4 atmospheres. It can naturally be reduced in these cases to 0° C. and 760 mm. The reduction factor $k'$ has then to be multiplied by 2, 3 or 4 times 735/760, and the counting mechanism 35 of the volume reductor must be preceded by a gear-mechanism, which produces the corresponding multiplication therefor. Such a reduction-mechanism is shown in dotted lines at 68 in Figure 2.

The requirement for such operation at high working-pressures is that the absolute working-pressure remains within the limits of applicability of Equation II. Where this requirement is not fulfilled it can easily be produced by installing a pressure-regulator.

At each practical pressure measurement a minimum volume change is unavoidable, and so the volume $V_0^*$ enclosed in the comparison-gas chamber is increased to a small degree $\delta = e.p_u^*$ with the existing temperature and the corresponding existing pressure $p_u^*$, where the coefficient "$e$" represents the volume which corresponds to the movement of the setting member of the manometer in changing the loading $p_u^* = 0$ to the loading $p_u^* = 1$.

The size of this increase is determined by the construction of the manometer and the choice of the positioning energies. It increases for $p_u^*$ max. to a maximum size of about $\delta = 0.01 V_0^*$ and can be chosen much smaller in most cases. To allow for this small volume-change a corresponding correction-term can be included in Equation II. It then is valid as can be easily proved as Equation IIa.

$$k = 1 + \frac{p_u}{p_0} - \frac{p_u^*}{p_0} - \frac{ba.e.p_u^*}{p_0} \quad (11a)$$

Then because of the smallness of $\delta$ for the barometer-reading a middle value (for example 760 mm.) can be inserted. In this case the error due to the barometric variation can be taken as a maximum of about 0.05%. In other words, the influence of the volume-change given by the manometer construction is practically nil, if Equation IIa is used to calculate the opening 39 of the drum 38.

If the working-pressure varies by several atmospheres, the measurement is usually made in a part-flow bled off from the working-duct and it is also well known to carry out the volume-reduction in a part-flow in such cases, which is proportional by volume to the throughput of the main-duct. Then the counting-mechanism of the reductor shows a reduced volume at the normal state, which is proportional to the throughput in the main-duct reduced to the normal state.

In such cases instead of a pressure-regulator preceding the meter a duct-closure formed as a sort of a safety valve can be provided after the meter with advantage, which safety-valve operates as soon as the working over-pressure in the part-flow duct exceeds a predetermined amount. If one makes $p_u = 0$, the part-flow can be open to the free air.

As shown in Figure 5 a small side conduit 1' is branched off from the measuring conduit 1. A proportioning device A is positioned in the conduit 1' actuated by the flow meter 2. The proportionating device A is of the known and conventional construction and allows a partial stream of the gas to flow through the conduit 1' in amount proportional to the amount of the main flow of gas through the conduit 1. An example of a proportioning device A is a bellows gas meter on whose axle or shaft there is positioned a disc with holes or slits. The shaft of the main flow meter 2 is arranged centrally thereto and possesses on its end projecting into the housing of the proportioning meter A a disc with slits or holes formed in the same manner, both discs being arranged to rotate in close sliding engagement with one another. This will be recognized as a conventional arrangement for part-flow measurements. The volume reduction in accordance with the invention takes place in connection with the part-flow meter 2', whose pre-pressure is regulated to the desired amount by a pressure-decreaser B of conventional construction and from which the partial gas flow is either conducted to any desired use or blown into the open air through a safety valve C.

In connection with the part-flow meter 2', the rigid comparison-gas vessel 4 of constant volume, the pressure conduit 15, and the meter shaft 37 are shown. The remaining portions of the volume reductor with the exception of the counting mechanism 35, the bar 30, and the friction wheel casing 86, together form the arrangement marked D, which, for example, corresponds to one of the constructions shown in the foregoing figures.

The situations can now be dealt with in practice where not only are there pressure-variations but also temperature-variations outside the normal limits, i.e., situations in which the volume-reduction as effected by the known methods would be useless since almost immediately deformation or rupture of the membrane-boxes would occur. Such unusual conditions can be easily controlled and measuring results obtained with the corrections made by the process according to the invention, which lie within specified tolerance-limits.

If for this purpose an equation would be taken as a basis for the correction, in which the series expanded from the equation of state is broken off only after the fourth or fifth term unwanted complications relating to the construction of the correction devices would result.

In order to get correct measurements without such complications, it is only necessary according to the invention to use a pair of variable ratio drives one of which represents the variation between the reduced $k$-value calculated according to the normal equation of state and the value given by the reductor according to Equation II as a function of this latter value whereas the other variable ratio drive is controlled by a remote thermometer installed in the measurement-duct and sets the correction-ratio proportional to the existing temperature.

The basis for this arrangement is explained as follows.

If the factor $k$ is calculated according to Equation I and is compared with that $k$-value which is given by calculation from the normal equation of state, it will then be seen that the two values approximately deviate from each other more and more as the pressure and temperature variations become greater. These variations now represent a function of the $k$-values.

For greater understanding the above will be applied in a practical case, in which the volume reductor is used for a predetermined large temperature-range, as for example, $-15$ and $+45°$ C. and in which pressure variations $\Delta p/p_0$ up to $\mp 0.15$ are met with.

If the variations (percentages) calculated for this range are mapped as a function of the $k$-value calculated according to Equation I with the temperature as a parameter, and if the found values relating to a definite temperature, for example, $-15°, 0°, +15°, +30°, +45°$ C. are simply tabulated in columns of which the first column includes the $k$-value calculated according to Equation I, it will be seen that the variations relating to a definite $k$-value represent a definite multiple of the respective temperature and that this multiple is the same for all temperatures and can be evaluated as a function of the $k$-value. This multiple is then preferably to be mapped for the particular $k$-values into the last column of the table, which gives a clear representation of the function.

Since now the $k$-value calculated according to Equation I is identical with the $k$-value obtained by the volume reductor according to Equation II, and following the above consideration it is only necessary for getting as correct measurement results as with the expanded series of the equation of state, including the fourth and fifth term, to insert a pair of variable ratio friction drives, one of which reproduces said multiple as a function of the $k$-factor observed on the reductor, that is, as a function of the particular position of the friction wheel 34, whereas the other is controlled by a remote thermometer in the duct and gives a ratio proportional to the respective temperature.

Figure 4 shows an embodiment by way of example of an embodiment according to the invention for volume reduction in the way described for greater variation of the working state.

On the shaft 30, which is operated in the same way as described for Figures 1–3, besides the friction wheel 34 a second rotatable friction wheel 69 is arranged, the rotation of which is independent of the rotation of the friction wheel 34, which rolls on a drum 71 provided with an opening 70. The opening 70 is so shaped and gauged that the transfer-ratio between the friction wheel 69 and the drum 71 is of a size being adequate to the $k$-value found in the above described tabular way (last column of the mentioned tabulated view), and thus, corresponding to the respective setting of the friction wheel 34. This size must now be multiplied by the temperature value $\theta/100$ quotable from said tabular view. This multiplication is brought about by said second variable-ratio device given by the friction wheel 69.

This is brought about by said second variable-ratio drive driven by the friction wheel 69. The friction wheel 69 operates a shell 72 connected to it and a drum 75 connected to a shaft 74 provided with a connecting pin 73, whereby the connecting pin 73 engages in a slit (not shown) of the shell 72. The cylinder 75 is provided with a projecting relief piece 76 which operates the friction wheel 77 on rotation of the cylinder 75. The friction wheel 77 is rotatably arranged on a shaft 78, which is axially displaced proportional to the existing temperature by a setting-member 79 and the lever 81 engaging at 80 connected to a remote thermometer in the measuring-duct (not shown).

The friction wheel 77 operates on a shell 82 connected to it and also operates by means of a connecting pin 83 the sunwheel 84 of a differential-gear of which the other sunwheel 85 is operated by the friction wheel 34 over a shell 86, connecting-pin 87 and a transfer-device 88 shown in dotted lines.

The setting position of the friction wheel 77 corresponds to the existing gas temperature and the projecting piece 76 of the drum 75 is so formed that the operation of the friction wheel 77 is proportional to the temperature corresponding to the respective setting position of this wheel.

Consequently the two interconnected transfer-mechanisms 69, 70, 71 and 75, 76, 77 give the sunwheel 84 an advance which is proportional to the variations between the theoretical value of the factor $k$ calculated according to the normal equation of state on the one hand and the $k$-value produced by the corrector according to Equation II on the other hand.

I claim:

1. Method for the volume correction of gases flowing through pipe lines which comprises maintaining a substantially constant volume of a comparison gas in heat exchange relation to the gas flowing through the pipe line to thereby maintain the comparison gas at substantially the temperature of the gas flowing through the pipe lines, and substantially, continuously measuring the change in pressure differential between the comparison gas and the gas flowing through the pipe line as a volume reduction factor.

2. Method according to claim 1 which includes maintaining the pressure of gas flow through said pipe line at a substantially constant value.

3. Volume-correction device for use in combination with a meter for measuring the volume of gas flowing through a pipe line having a drive shaft rotatably actuated by the flowing gas, comprising means defining an enclosed substantially constant volume chamber containing a comparison gas therein and positioned for contact with gas flowing through the meter being measured thereby, first manometer means positioned for pressure actuation by the comparison gas in said chamber without substantial volume change of said chamber, second manometer means positioned for pressure actuation by the gas flowing through the meter, differential means positioned for actuation by said first and said second manometer means and responsive to the pressure differential therebetween, a counting mechanism driven by the drive shaft of the meter, and means actuated by said differential means for varying the drive-transmission ratio between the drive shaft, and said counting mechanism in accordance with the value $1+p_u-p_u^*$, $p_u$ representing the gauge pressure of the gas being measured and $p_u^*$ representing the gauge pressure of the comparison gas.

4. Volume-correction device for use in combination with a meter for measuring the volume of gas flowing through a pipe line having a drive shaft rotatably actuated by the flowing gas, comprising means defining a rigid enclosed constant volume chamber containing a comparison gas therein and positioned for contact with gas flowing through the meter being measured thereby, first manometer means positioned for pressure actuation by the comparison gas in said chamber without substantial volume change of said chamber, second manometer means positioned for pressure actuation by the gas flowing through the meter, differential means positioned for actuation by said first and said second manometer means and responsive to the pressure differential therebetween, a counting mechanism driven by the drive shaft of the meter, and means actuated by said differential means for varying the drive transmission ratio between the drive shaft and said counting mechanism in accordance with the value $1+p_u-p_u^*$, $p_u$ representing the gauge pressure of the gas being measured and $p_u^*$ representing the gauge pressure of the comparison gas, said last-mentioned means comprising a cylinder rotatably driven by the meter drive shaft said cylinder defining an opening interrupting its surface and varying in circumferential width along the axial length thereof, a friction wheel connected for driving actuation of said counting mechanism and positioned in frictional contact with the surface of said cylinder, a sector shaped setting member positioned for swinging actuation by said differential means and defining a surface inclined with respect to the plane of its swing proportional to the amplitude of the swing, said friction wheel being mounted on an axially movable shaft having a member positioned for stop-contact with said setting member surface, and means axially urging said shaft in a direction for contact between said member and surface.

5. Volume-correction device according to claim 4, including means for axially moving said shaft in a direction to move said member out of contact with said surface once upon each rotation of the meter drive shaft.

6. Volume-correction device according to claim 5, in which said last-mentioned means includes a cam rotatably actuated by the meter drive shaft, a cam follower positioned on the end of said axially movable shaft and axially movable with respect thereto, and spring means biasing said cam follower and axially movable shaft in an axial direction away from each other.

7. Volume-correction device according to claim 6, in which said setting member is mounted on a shaft for swinging actuation upon rotation of said shaft and in which said differential means comprises a planet wheel mounted on a shaft connected to the shaft of said setting member as a crank arm, and two sectional sun wheels, one of said sun wheels being connected to said first manometer means and the other of said sun wheels being connected to said second manometer means.

8. Volume-correction device for use in combination with a meter for measuring the volume of gas flowing through a pipe line having a drive shaft rotatably actuated by the flowing gas, comprising means defining an enclosed substantially constant volume chamber containing a comparison gas therein and positioned for contact with gas flowing through the meter being measured thereby, manometer means positioned for pressure-actuation by the comparison gas in said chamber without substantial volume change of said chamber, a counting mechanism driven by the drive shaft of the meter, means for maintaining the gas flowing through the meter at a constant pressure $p_u$, and means actuated by said manometer means for varying the drive transmission ratio between the drive shaft and said counting mechanism in accordance with the value $1+p_u-p_u^*$, $p_u^*$ representing the gauge pressure of the comparison gas.

References Cited in the file of this patent

UNITED STATES PATENTS

| | | |
|---|---|---|
| 1,278,077 | Reeve | Sept. 3, 1918 |
| 1,621,203 | Houghton | Mar. 15, 1927 |
| 1,881,572 | Herz | Oct. 11, 1932 |
| 2,059,547 | Brandl | Nov. 3, 1936 |
| 2,222,551 | Ziebolz et al. | Nov. 19, 1940 |
| 2,348,593 | Beitler | May 9, 1944 |

FOREIGN PATENTS

| | | |
|---|---|---|
| 247,871 | Germany | June 7, 1912 |
| 492,082 | Great Britain | Sept. 14, 1938 |

OTHER REFERENCES

A textbook by Hausmann and Slack, entitled Physics, 2nd edit., pages 274–277.